United States Patent
Wong et al.

(10) Patent No.: US 8,899,554 B2
(45) Date of Patent: Dec. 2, 2014

(54) REVERSE MARKED FISH TAPE

(75) Inventors: Kingston Wong, Beach Park, IL (US); Russell Goldmann, II, Highland Park, IL (US)

(73) Assignee: Klein Tools, Inc., Lincolnshire, IL (US)

(*) Notice: Subject to any disclaimer, the term of this patent is extended or adjusted under 35 U.S.C. 154(b) by 825 days.

(21) Appl. No.: 12/334,637

(22) Filed: Dec. 15, 2008

(65) Prior Publication Data
US 2009/0159862 A1    Jun. 25, 2009

Related U.S. Application Data

(60) Provisional application No. 61/008,250, filed on Dec. 19, 2007.

(51) Int. Cl.
*H02G 1/08* (2006.01)
*G01B 3/10* (2006.01)

(52) U.S. Cl.
CPC . *H02G 1/083* (2013.01); *G01B 3/10* (2013.01)
USPC .................... 254/134.3 FT; 33/759

(58) Field of Classification Search
USPC .................... 254/134; 33/755, 759
See application file for complete search history.

(56) References Cited

U.S. PATENT DOCUMENTS

| | | |
|---|---|---|
| 3,078,058 A | 2/1963 | Roe |
| 3,270,421 A | 9/1966 | Jones |
| 3,528,644 A | 9/1970 | Scott |
| 4,092,780 A | 6/1978 | Trethewey et al. |
| 4,574,486 A * | 3/1986 | Drechsler .................. 33/765 |
| 4,582,297 A | 4/1986 | Conti |
| 5,062,215 A | 11/1991 | Schlitt |
| 5,110,092 A | 5/1992 | Blaha et al. |
| D351,561 S | 10/1994 | Moffatt et al. |
| 5,423,516 A | 6/1995 | Blaha |
| D404,323 S | 1/1999 | Jackson |
| 6,070,338 A * | 6/2000 | Garity ........................ 33/760 |
| 6,115,926 A * | 9/2000 | Robell ....................... 33/1 B |
| D506,939 S | 7/2005 | King |
| 2007/0187659 A1* | 8/2007 | Wiesemann et al. . 254/134.3 FT |

* cited by examiner

*Primary Examiner* — Lee D Wilson
*Assistant Examiner* — Jamal Daniel
(74) *Attorney, Agent, or Firm* — McDonnell Boehnen Hulbert & Berghoff LLP

(57) ABSTRACT

The fish tape includes a measuring scale. The tape is scaled from zero to a number equal to the length of the tape. The numbers incrementally increase from the tapes proximal end to the tapes distal end.

7 Claims, 3 Drawing Sheets

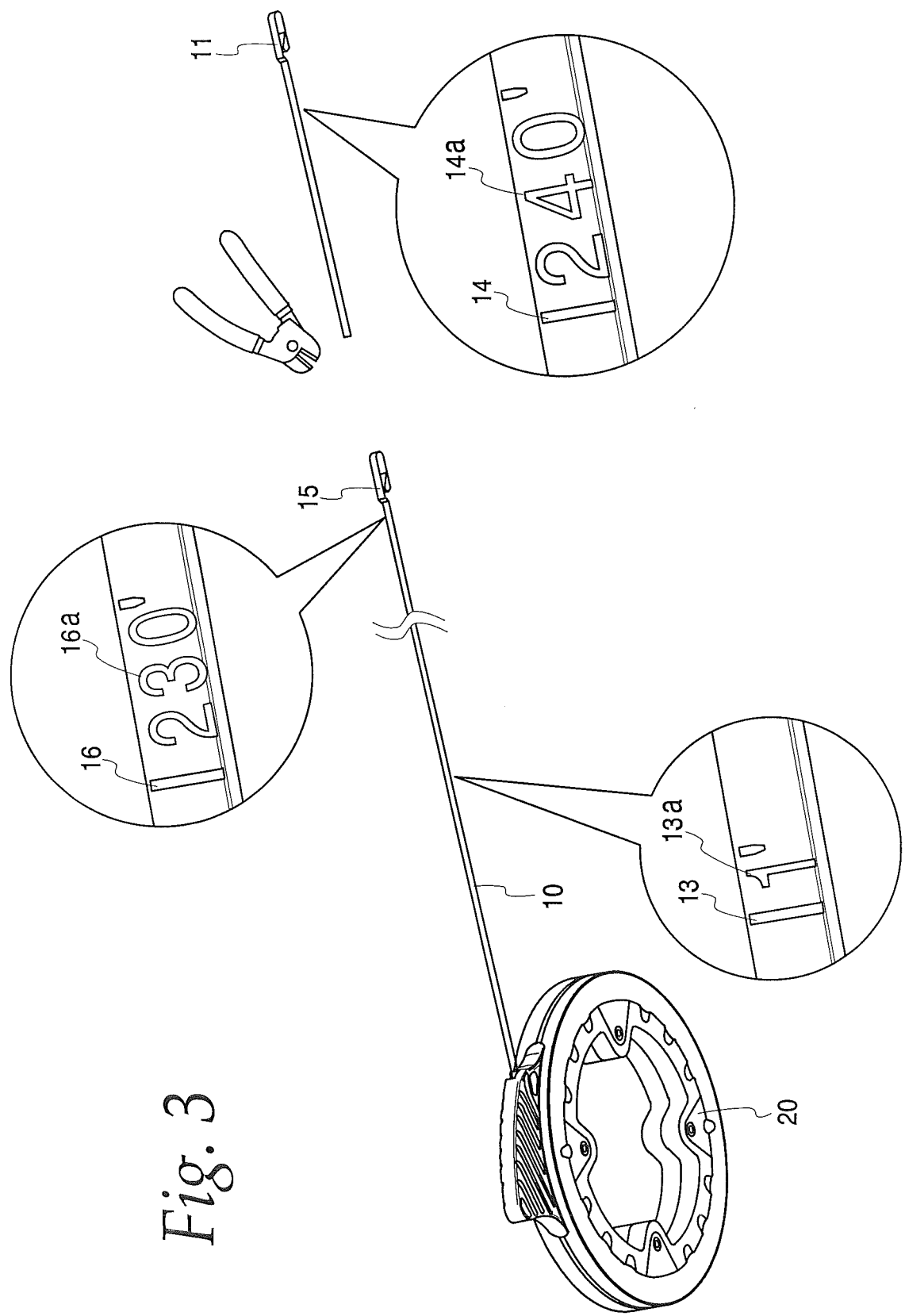

REVERSE MARKED FISH TAPE

RELATED APPLICATION

This application claims benefit under 35 U.S.C. Section 119(e) of U.S. Provisional Application No. 61/008,250, filed Dec. 19, 2007.

FIELD OF THE INVENTION

The present invention relates generally to a method and apparatus to pull power, phone and data cable/wire/line/etc. ("cable") and/or to measure the length of such cable retaining structure, whether the structure be in channels or trays, underground, overhead or within walled conduit, supports or the like ("conduit"). More specifically, this invention relates to a fish tape reel assembly having the means to measure and display an indication of length of tape feed.

DESCRIPTION OF THE PRIOR ART

In the course of installing cable into conduit, an electrician generally uses a tool typically known as a fish tape. A fish tape is an elongated member preferably made of tempered spring steel, stainless steel, nylon, fiberglass with a nylon jacket, or multi-stranded steel wire. The fish tape is rigid enough to be pushed through the conduit, yet flexible enough to bend around corners or curves which may be inherent in a particular run of conduit. As the tape needs to be used for long distances, it is quite typical to have lengths of up to 240 feet or more. To make these runs, or possibly even longer runs, manageable, and to make the storage of the fish tape possible, it is typically wound about a reel, which may be enclosed by a housing. One end of the fish tape, the proximal end, is usually anchored to a stationary or rotatable portion of the reel to keep it from coming loose. The other, leading (or distal) end of the fish tape is adapted in some way (e.g. hooked) to readily attach cable(s) to be pulled by the fish tape through the conduit.

In use, after the fish tape has been "fished" or threaded through the conduit, the cable to be installed is affixed to the end of the fish tape and the fish tape is pulled back through the conduit, thereby drawing the cable with it. Once through, the cable is typically terminated at any necessary connection on each end and installation of the cable within the conduit is complete.

When installing cables, it is desired, and usually necessary, to measure the length of a particular run of conduit and/or the location of an obstruction in the conduit in which the cable is to be placed. An inaccurate measurement or estimate may cause the installer to cut the cable too short, or too long, resulting in wasted scrap cable and therefore wasted money.

The most common way to measure the length of the run is to use measuring string. Here, the fish tape is first inserted at the proximal end of the run and fished to the distal end of the run. Next, a measuring string (and perhaps an accompanying pull string) is affixed to the leading end of the fish tape appearing at the distal end of the run. Then, the fish tape and the attached string(s) are pulled back through the conduit. When the leading end of the fish tape has been retrieved from the proximal end of the run, the installer can determine the length of the run via the measuring string. The cable(s) may (not necessarily) then be cut to the appropriate length. Finally, to install the cable(s) in the conduit, the cable(s) are then affixed to the leading end of the string(s) appearing at the proximal end of the run and are pulled back through the conduit. Once through, the cable is terminated as necessary.

Another, albeit less common, way to measure the run is to first insert the fish tape at the proximal end of the run and to fish it to the distal end of the run. Once the leading end of the fish tape appears at the distal end of the run, the installer marks (perhaps with a piece of tape or a pen, etc.) the section of fish tape that is nearest to the proximal end of the run, pulls out the fish tape and lays it on the ground. The distance between the leading end of the tape and the marked section on the tape represents the required length of cable. The cable(s) are than measured against the fish tape and may then be cut to the appropriate lengths. In a next step, the fish tape is reinserted at the proximal end of the run and fished to the distal end of the run. Finally, to install the cable(s) in the conduit, the cut cable(s) are then affixed to the leading end of the fish tape appearing at the distal end of the run and are pulled back through the conduit.

Other prior art fish tapes have markings much like a common measuring tape. In particular, they start with "zero" indication at or near the leading end (distal end) of the fish tape and end with the highest unit measurement (i.e. "100" for a 100 foot fish tape) on the innermost usable part of the fish tape (proximal end), i.e., the part affixed to the stationary or rotatable part of the reel. Under certain conditions, these markings allow the electrician to determine the length of cable required for a particular application prior to the pull. However, this type of fish tape presents a practical problem for electricians who thread multiple cables on a single pull or in the case that the fish tape becomes irretrievably snagged or stuck inside the conduit.

In particular, in order to ensure that the cables do not come loose in transit through the conduit, electricians often fasten the cables to the leading end (distal end) of the fish tape in a bundled intertwined tight knot. Once the bundle is pulled through the conduit to the end of the run, the electrician, rather than taking the time to unfasten and untangle the knot of cables, simply cuts off the knot, along with a section of the leading end of the fish tape.

This creates a problem with a fish tape that has unit measurement markings like a common measuring tape, i.e., unit measurement markings ascending from a "zero" mark near or at the leading end (distal end) to a highest unit measurement mark near or at the proximal end of the fish tape. With ascending unit measurement markings it becomes difficult to determine how much of the remaining fish tape is left on the reel, without fully unwinding the fish tape to confirm.

Another reason to cut off a portion of the fish tape may be because the fish tape became irretrievably snagged or stuck inside the conduit. In this case the electrician would simply cut off the fish tape at or near the proximal end of the conduit. Again, in this case, a fish tape with ascending unit measurement markings would lose much of its usefulness because it would be very difficult to determine how much of the remaining fish tape is left on the reel, without fully unwinding the fish tape to confirm.

Furthermore, electricians commonly tend to treat fish tapes, especially those made out of steel, as "consumable" items, by cutting off short sections of the more rigid steel tape for a variety of special applications.

OBJECTS OF THE INVENTION

Accordingly, it is an object of this invention to provide a fish tape having indicia thereon to enable measurement of lengths.

Another object of this invention is to provide a fish tape having indicia thereon whereby the leading end has the highest unit of measurement and the innermost end is the starting point or the zero unit measurement.

Yet another object of this invention is to provide a fish tape capable of being used as a consumable item.

Another object of this invention is to provide a fish tape whereby the amount of tape remaining therein is easily determined.

Still another object of the invention is to provide a fish tape that saves cable, time and money.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative and not as restrictive.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a perspective view of an embodiment of a fish tape assembly of the present invention showing a fish tape with unit line marks thereon after the leading portion of the fish tape has been cut off.

DETAILED DESCRIPTION OF THE ILLUSTRATED EMBODIMENT

Figure 1:
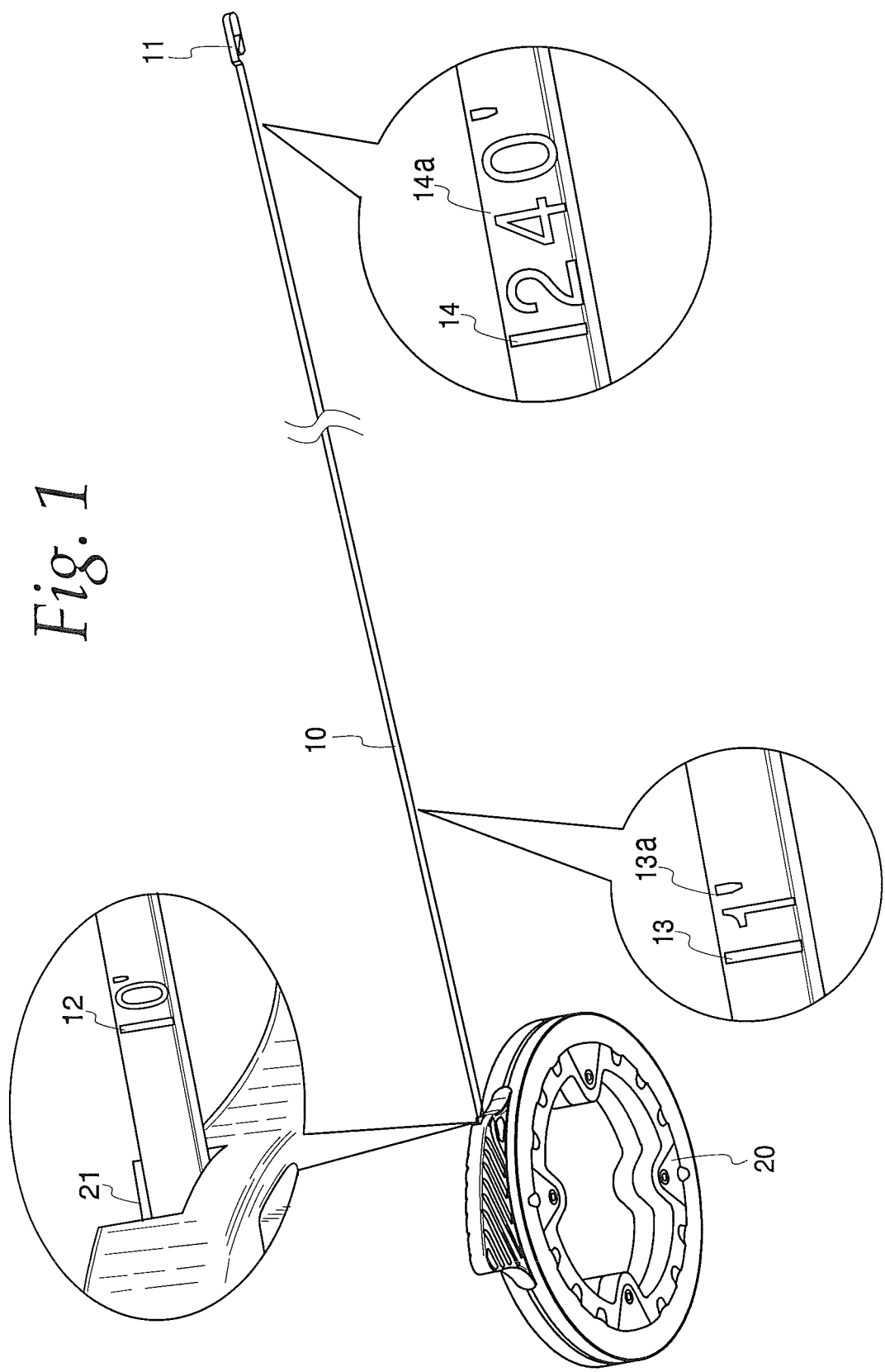
FIG. 1 is a perspective view of an embodiment of a fish tape assembly of the present invention showing a fish tape with unit line marks thereon.

Turning now to the Figures, FIG. 1 is illustrative of a preferred fish tape assembly used to house a fish tape incorporating the features of the present invention. In particular, when not in use, fish tape 10 is wound and stored around a fish tape reel (not shown) within fish tape housing 20. When in use, leading (or distal) end 11 of fish tape 10 is pulled out of fish tape housing 20 through opening 21 to whatever distance dictated by the particular job at hand. Fish tape 10 and leading end 11 are preferably made of tempered spring steel, stainless steel (steel may be especially suited for a "consumable" fish tape), nylon, fiberglass with a nylon jacket, or multi-stranded steel wire which can be bent by a user to form a hook. As particular types of installations may require particularly shaped tapes, it is quite typical to have varying widths as well as thicknesses to the tape. To prevent the hook from damaging or hooking into existing cables inside a conduit, the hook of leading end 11 should preferably be bent into the shape of a double hook as illustrated in FIGS. 1 and 3.

By way of example, FIG. 1 shows a fully extended fish tape 10 having a last unit line mark 14 at 240 feet as indicated by associated numeric mark 14a. The numerical mark in this case denotes 240 feet, however it will be understood that each numerical mark merely represents a certain value with reference to a distance measurement and that any type of value indicia (e.g., numbers, letters, symbols, Braille, etc.) in any scale can be used. In other words, in the example shown, the distance on fish tape 10 between unit line mark 14 and zero point 12 is 240 feet, whereby last unit line mark 14 is the last unit line mark denoted on fish tape 10 before leading end 11. Fish tape 10 further has a first unit line mark 13 at one foot as indicated by associated numeric mark 13a. In other words, in the example shown, the distance on fish tape 10 between unit line mark 13 and zero point 12 is one foot. Zero point (or the proximal end) 12 of fish tape 10 is preferably at or near the point on fish tape 10 where it can no longer be pulled from housing 20, whereby zero point 12 is outside of housing 20.

While fish tape 10 as shown in FIG. 1, by way of example, denotes unit line marks every foot, it will be understood that unit line marks can be of any unit of measurement and at any interval, so long as zero point 12 is at or generally near the point at which fish tape 10 can no longer be pulled from housing 20, whereby zero point 12 is outside of housing 20. Such reverse marking necessitates, that the value of the numeric mark (or value indicia) associated with the last unit line mark, i.e. the last unit line mark before the leading end, is always greater than the value of the numeric mark (or value indicia) associated with the first unit line mark.

Additionally, it will be understood that any suitable marking means, method or process can be used to indicate on fish tape 10 a first unit line mark, an end unit line mark and other unit line marks in between, along with their respective associated numeric marks (or value indicia). For example, it is preferable to laser mark, however other contemplated marking means and methods include, but are not limited to: dot peen marking, steel stamping, and embossing die, etching, etc.

During use, the user fishes leading end 11 of fish tape 10 to the desired location and can now easily determine the length of the run (i.e., the relative distance between the visible numeric markings at the distal and proximate ends of the run) by subtracting the associated numeric mark located near the proximal end of the run from the associated numeric mark located at or near the leading end 11 of fish tape 10. For example, and turning now to FIG. 2, the user starts by inserting fish tape 10 into light switch junction box 30, i.e., the proximal end of the run, and through conduit 31 to ceiling fan junction box 32, i.e., the distal end of the run. The leading end 11 of fish tape 10 is now at or near the distal end of the run, i.e., ceiling fan junction box 32. If, for example, leading end 11 of fish tape 10 is at or near a unit line mark associated with a numeric mark indicating 240 feet and the first unit line mark on fish tape 10 at the proximal end of the run is associated with a numeric mark indicating 215 feet, the user knows that the total length of the run is 25 feet, by subtracting 215 feet from 240 feet. Appropriately sized cables can now be pulled and installed.

Rather than pulling the appropriately sized individual cables through conduit 31 one at a time, it is desirable to fill the conduit with all necessary cables with only one pull. In the example shown in FIG. 2, the user would first insert leading end 11 into light switch junction box 30 (i.e., the proximal end of the run) and then push fish tape 10 through conduit 31 until leading end 11 has reached ceiling fan junction box 32 (i.e., the distal end of the run). Once leading end 11 has reached ceiling fan junction box 32. Next, the user would typically tie or otherwise affix multiple appropriately sized cables to leading end 11 of fish tape 10. After all cables have been affixed to leading end 11, the user would pull fish tape 10 together with the affixed cables back through conduit 31, thereby positioning the cables within conduit 31. Once leading end 11 has pulled completely pulled out of conduit 31, the user may cut off the cables from leading end 11. Further, in order to avoid the often cumbersome task of having to unravel or untie the knot of cables affixed to leading end 11, the user may simply cut off leading end 11 from fish tape 10 as shown in FIG. 3. After cutting off leading end 11, the user may bend new leading end 15 to form a new hook, preferably a double hook, as shown in FIGS. 1 and 3. This described use of fish tape 10 as a consumable item, i.e., the ability to cut off parts of the fish tape, thereby trimming it shorter and shorter, is one advantage over fish tape that is numbered like a common measuring tape. The user of the disclosed fish tape is always able to quickly ascertain the length of the remaining fish tape, despite its treatment as a consumable item.

In the example of FIG. 1, fish tape 10 has its leading end 11 at or near the last unit line mark 14 and its associated numeric mark 14a, i.e., 240 feet. FIG. 3 depicts a fish tape assembly where a user has cut off portions of fish tape 10 comprising the leading end 11 and the last unit line mark 14, resulting in a new leading end 15 at or near a new last unit line mark 16 and its associated numeric mark 16a, i.e., 230 feet. Although ten feet have been cut off the end of fish tape 10, the user is able to quickly ascertain the length of the remaining fish tape by simply reading the new last unit line mark 16 and its associated numeric mark 16a, i.e., the user knows that there are 230 feet of fish tape left for use. No calculations are necessary.

Figure 2:
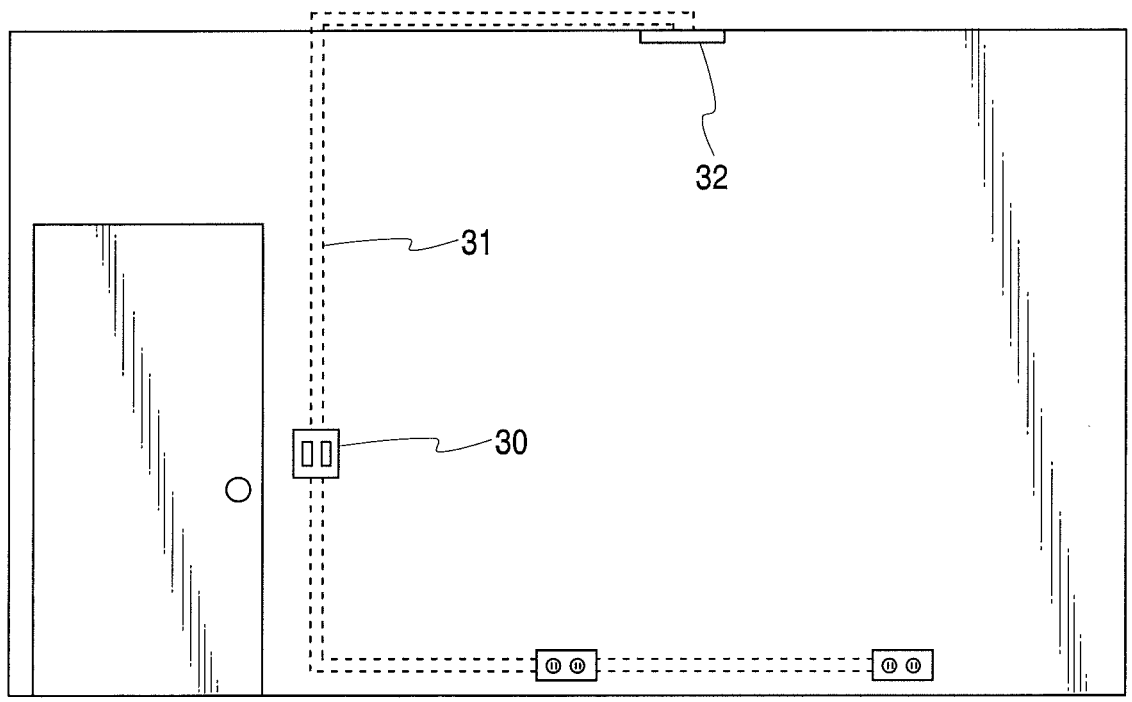
FIG. 2 is a diagram showing conduit and junction boxes which may be found in a commercial/industrial and/or residential application.

Using the fish tape assembly depicted in FIG. 3 to measure the length of the run between light switch junction box 30 and ceiling fan junction box 32 in FIG. 2, the installer would still be able to determine that the length of the run is 25 feet. In this case, new leading end 15 of fish tape 10 would be at or near a unit line mark associated with a numeric mark indicating 230 feet and the first unit line mark on fish tape 10 at the beginning of the run is at or near a unit line mark associated with a numeric mark indicating 205 feet. Again, the difference between the two numeric marks represents the length of the run. Therefore, the reverse marking of the fish tape of the present invention allows it to be used as a consumable item while still allowing a user to quickly ascertain the length of the remaining fish tape without having to conduct calculations. Over time, the original 240 feet fish tape will turn into a 200 foot fish tape, then a 100 foot tape, and so on, until such time as the fish tape can no longer be used because too much of the fish tape 10 has been cut off.

For those users that treat their fish tapes as consumable items, i.e., users who have developed the habit of cutting off the leading end of the fish tape along with the knot of cables, it has been difficult to know how much fish tape 10 is remaining, if the fish tape is either not marked or is marked like a common measuring tape. With the reverse markings of the present invention the user need only pull out the leading end of fish tape 10 and note the unit line mark closest to the leading end to know exactly how much fish tape 10 is available. This presents a number of additional advantages for a user of the disclosed fish tape.

For instance, in a situation where the length of the run is known, a user of the disclosed fish tape will be able to quickly determine whether the fish tape is long enough to be used for the particular installation, thereby saving time. Especially in a industrial or commercial environment, where the length of a run can be more easily identified, readily knowing how much fish tape is available is an important advantage. This enables the user to select the correct length fish tape for the particular installation, i.e., if the length of the run is 60 feet, the user will be sure that the fish tape that has 70 feet of fish tape left is appropriate for the job, while the fish tape only having 55 feet of fish tape left, is not. In the end, installations will become faster and more cost efficient.

While FIGS. 1 through 3 illustrate only one design of a fish tape assembly used by the preferred embodiment of the present invention, it should be understood that different sizes and shapes are obviously a matter of design choice and work necessity. The reverse marking of a fish tape can be incorporated in any such design of fish tape assemblies.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A fish tape reel assembly, comprising:
    A fish tape housing;
    an elongated member having a leading end, a fixed end and a length between said ends, said member capable of being rolled into said housing and extended from said housing wherein said fixed end is attached to the fish tape housing;
    a plurality of unit line marks on said length; and
    a numerical indicia associated with each mark wherein said indicia incrementally increase from said fixed to said leading ends, and wherein there is an absence of corresponding decreasing numerical indicia from the fixed end to the leading end associated with the increasing numerical indicia.

2. The assembly of claim 1, wherein said marks and/or said indicia are laser marked on said member.

3. The assembly of claim 1, wherein said marks are spaced at foot long intervals throughout said length.

4. The assembly of claim 1, wherein the leading end of the elongated member is adapted for being bent to form a hook.

5. The assembly of claim 1, wherein the leading end is adapted for being bent to form a double hook.

6. The fish tape of claim 1, wherein the elongated member is comprised of tempered spring steel, stainless steel, nylon, fiberglass, or multi-stranded steel.

7. The assembly of claim 1, wherein the elongated member is adapted to be consumable.

* * * * *